(12) United States Patent
Takeishi et al.

(10) Patent No.: US 7,241,718 B2
(45) Date of Patent: Jul. 10, 2007

(54) DIMETHYL ETHER STEAM REFORMING CATALYST AND METHOD FOR PRODUCING THE SAME

(75) Inventors: Kaoru Takeishi, Hamamatsu (JP); Kosei Yamamoto, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 260 days.

(21) Appl. No.: 10/730,638

(22) Filed: Dec. 8, 2003

(65) Prior Publication Data

US 2004/0192547 A1  Sep. 30, 2004

(30) Foreign Application Priority Data

Feb. 28, 2003  (JP) .............................. 2003-054413

(51) Int. Cl.
*B01J 23/70* (2006.01)
*B01J 23/72* (2006.01)
*B01J 23/00* (2006.01)

(52) U.S. Cl. ............. 502/346; 502/327; 502/329; 502/331; 502/336; 502/342; 502/324

(58) Field of Classification Search ................ 502/324, 502/327, 329, 331, 336, 338, 342, 346
See application file for complete search history.

(56) References Cited

U.S. PATENT DOCUMENTS

| | | | | |
|---|---|---|---|---|
| 3,554,930 A | * | 1/1971 | Rogers et al. ............... | 502/342 |
| 3,661,806 A | * | 5/1972 | Briggs et al. ................ | 502/313 |
| 3,701,739 A | * | 10/1972 | Bovarnick et al. .......... | 502/318 |
| 3,840,471 A | * | 10/1974 | Acres .......................... | 502/177 |
| 3,988,263 A | * | 10/1976 | Hansford ..................... | 502/337 |
| 4,129,523 A | * | 12/1978 | Snowden ..................... | 502/307 |
| 4,349,464 A | * | 9/1982 | Wainwright et al. ........ | 502/301 |
| 4,366,260 A | * | 12/1982 | Wainwright et al. ........ | 518/713 |
| 4,375,424 A | | 3/1983 | Slaugh ......................... | 252/463 |
| 4,780,300 A | * | 10/1988 | Yokoyama et al. ....... | 423/418.2 |
| 5,175,064 A | * | 12/1992 | Labinger et al. ............... | 429/40 |
| 5,990,040 A | * | 11/1999 | Hu et al. ...................... | 502/342 |
| 6,361,757 B1 | * | 3/2002 | Shikada et al. ............. | 423/651 |
| 6,451,864 B1 | * | 9/2002 | Wang et al. ................. | 518/715 |

(Continued)

FOREIGN PATENT DOCUMENTS

DE  10048160 A  5/2001

(Continued)

OTHER PUBLICATIONS

European Search Report, corresponding to Application EP03028792.4, mailed Mar. 2, 2004.

(Continued)

*Primary Examiner*—Cam N. Nguyen
(74) *Attorney, Agent, or Firm*—Myers, Bigel, Sibley & Sajovec, P.A.

(57) ABSTRACT

The object of the present invention is to achieve excellent reforming ability even at lower temperatures, with a dimethyl ether steam reforming catalyst.

According to the present invention, there is provided a dimethyl ether steam reforming catalyst capable of steam-reforming dimethyl ether to obtain hydrogen, comprising active alumina, Cu, and at least one element selected from the group consisting of Mn and Fe, the catalyst being prepared by a sol-gel method, and the catalyst having a porous structure.

7 Claims, 5 Drawing Sheets

U.S. PATENT DOCUMENTS

| | | | |
|---|---|---|---|
| 6,479,428 B1* | 11/2002 | Tonkovich et al. | 502/302 |
| 6,548,447 B1* | 4/2003 | Yokoyama et al. | 502/331 |
| 6,576,217 B1* | 6/2003 | Nojima et al. | 423/651 |
| 6,583,084 B2* | 6/2003 | Hagihara et al. | 502/329 |
| 6,627,572 B1* | 9/2003 | Cai et al. | 502/84 |
| 6,693,057 B1* | 2/2004 | Cai et al. | 502/84 |
| 6,784,135 B2* | 8/2004 | Scholten et al. | 502/245 |
| 6,903,050 B2* | 6/2005 | Ilinich et al. | 502/346 |
| 6,919,066 B2* | 7/2005 | Holzle et al. | 423/648.1 |
| 6,926,880 B2* | 8/2005 | Holzle et al. | 423/648.1 |
| 2002/0132155 A1 | 9/2002 | Shikada et al. | |
| 2003/0180215 A1* | 9/2003 | Niu et al. | 423/651 |

FOREIGN PATENT DOCUMENTS

| | | |
|---|---|---|
| EP | 0978314 A | 2/2000 |
| EP | 1174408 A | 1/2002 |
| JP | 10-174870 A | 6/1998 |
| JP | 2001096159 | 4/2001 |
| JP | 2002-233756 A | 8/2002 |
| JP | 2002263504 | 9/2002 |

OTHER PUBLICATIONS

Takeishi, K., et al. "Steam Reforming of Dimethyl Ether over Some Copper Catalyst" *Proceedings of 79th Spring Meeting of Japan Chemical Society.* 2001.

* cited by examiner

DIMETHYL ETHER STEAM REFORMING CATALYST AND METHOD FOR PRODUCING THE SAME

RELATED APPLICATIONS

This application claims priority from Japanese Patent Application No. 2003-054413 filed Feb. 28, 2003, the disclosure of which is incorporated by reference herein in its entirety.

BACKGROUND OF THE INVENTION

1. Field of the Invention

The present invention relates to a reforming catalyst capable of steam-reforming a fuel such as dimethyl ether to produce hydrogen, and especially, to a reforming catalyst prepared by a sol-gel method and excellent particularly in low temperature activity.

2. Description of Related Art

Dimethyl ether (hereinafter, referred to as DME) is a fuel comparatively safer and having higher calories than methanol and the like, therefore, there is envisaged utilization of DME as a fuel of a fuel cell power generation system of small output used in a mobile power source for automobiles and the like. Fuel cell generation is actuated using hydrogen and oxygen as a fuel, therefore, when a DME fuel is used, a DME reforming catalyst producing hydrogen efficiently from DME is necessary.

Conventionally, Cu—Zn-based catalysts are widely known as a catalyst for obtaining a mixed gas rich in hydrogen by steam-reforming of methanol and DME. However, with these catalysts, a mixed gas after reforming has low hydrogen concentration and manifests low reforming efficiency.

As a method for preparing a reforming catalyst using a solid acid, an impregnation method as described in Japanese Patent Provisional Publication No. 2001-96159 is listed. However, in an impregnation method in which a carrier made of an inorganic oxide such as alumina ($Al_2O_3$) or silica ($SiO_2$) is impregnated in a catalyst metal solution to support a catalyst metal, a catalyst metal is supported only on the surface of a catalyst layer, showing poor dispersion. Furthermore, in the impregnation method, decrease in a reforming ability is a caused sometimes by sintering (aggregation) of an active metal by heat.

In a co-precipitation method general as a catalyst preparation method, a catalyst is prepared by precipitation of a metal oxide or metal hydroxide by adding an acid or alkali to an aqueous solution of an inorganic metal salt. However, in the co-precipitation method, there occur sometimes problems where impurities contained in a raw material can not be excluded easily, that salts used in precipitation are liable to be incorporated as impurities and that a homogeneous catalyst can not be prepared easily due to irregularity in the pH in growth of a precipitation.

Furthermore, the present inventors have disclosed a $Cu/Al_2O_3$-based catalyst prepared by a sol-gel method in Japanese Patent Provisional Publication No. 2002-263504. This catalyst shows an excellent reforming ability at temperatures of 275° C. or more, however, further improvement has been required at lower temperatures 200° C. to 275° C.

SUMMARY OF THE INVENTION

The present invention has an object of providing a dimethyl ether steam reforming catalyst capable of obtaining an excellent reforming ability even at low temperatures such as 200° C. to 275° C., at which a reaction does not occur easily with a normal catalyst.

According to the present invention, there is provided a dimethyl ether steam reforming catalyst capable of steam-reforming dimethyl ether to obtain hydrogen, comprising active alumina, Cu, and at least one element selected from the group consisting of Mn and Fe, the catalyst being prepared by a sol-gel method, and the catalyst having a porous structure.

According to another aspect of the present invention, there is provided a dimethyl ether steam reforming catalyst capable of steam-reforming dimethyl ether to obtain hydrogen, comprising active alumina, Cu, and at least one element selected from the group consisting of Mn, Fe and Zn, the catalyst being prepared by a sol-gel method, and the catalyst having a porous structure, wherein the total content of said Cu and said at least one element is 25 wt % to 35 wt %.

According to still another aspect of the present invention, there is provided a method for producing a method for producing a dimethyl ether steam reforming catalyst capable of steam-reforming dimethyl ether to obtain hydrogen, comprising the steps of: adding an acid, a Cu salt and at least one salt selected from the group consisting of Mn salts, Fe salts and Zn salts to an aluminum alkoxide to produce a sol; drying the resulting sol by evaporation to produce a gel; calcinating the resulting gel to obtain a solid; and reducing the resulting solid.

As described in detail below, a catalyst prepared by a sol-gel method according to the present invention has a feature that a catalyst metal is highly dispersed and is not easily sintered (aggregated). Furthermore, by inclusion of Mn, Fe or Zn, Copper being active in DME steam reforming reaction can be increasingly dispersed and highly active Cu and $Cu^+$ can be kept stable. By this, according to the present invention, an excellent reforming ability can be obtained even at low temperatures such as 200° C. to 275° C., at which a reaction does not occur easily with a normal catalyst.

A catalyst prepared by a sol-gel method according to the present invention can have a large pore diameter without reducing the specific surface area by inclusion of Mn, Fe, and/or Zn. Pores of 80 Å to 200 Å are most suitable for DME reforming and can provide an excellent reforming ability even at low temperatures.

DETAILED DESCRIPTION OF PREFERRED EMBODIMENTS

Figure 1:
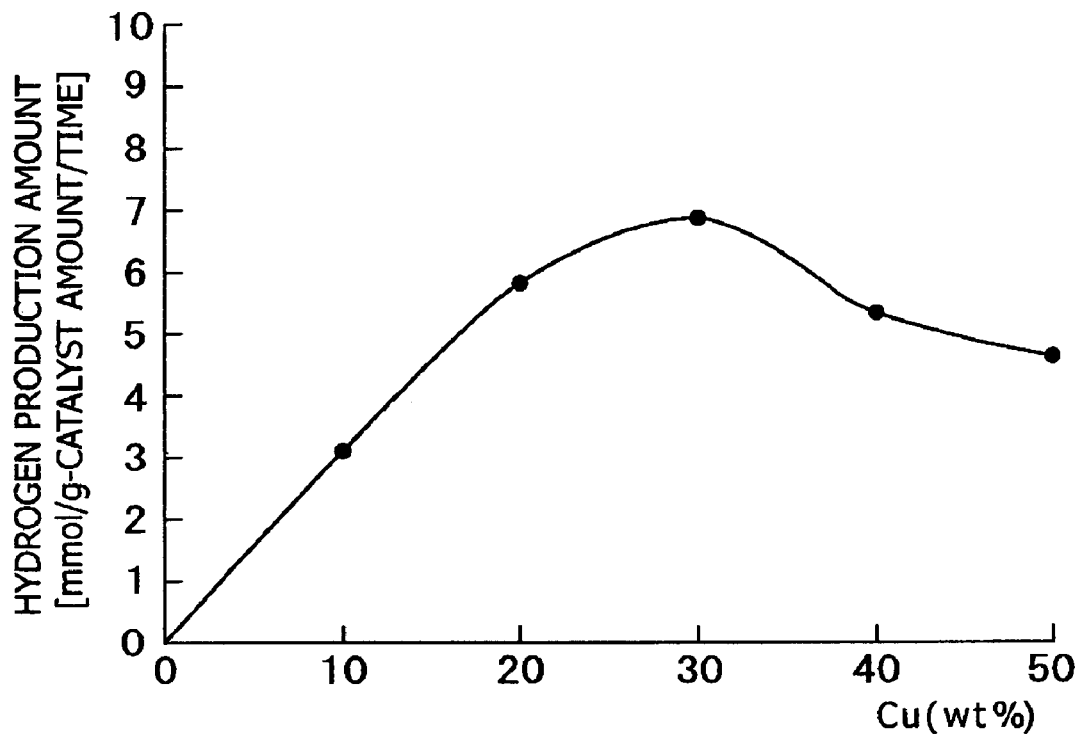
FIG. 1 is a graph showing the rate of hydrogen production for the Cu content of a $Cu/Al_2O_3$ catalyst prepared by a sol-gel method, in a steam reforming reaction (250° C.) of DME.

Embodiments of the present invention will be illustrated below. However, embodiments of the present invention described below do not limit the present invention.

The catalyst preparation method by a sol-gel method is a method in which an acid is added to a metal alkoxide and the like to control the pH to preferably 1 to 3, causing a hydrolysis reaction to prepare a uniform sol, which is further dried by evaporation utilizing an evaporator and the like to cause gelling. In the catalyst preparation method of the present invention, a catalyst can be prepared according to a procedure as described later by applying the above-mentioned method.

Specifically, the dimethyl ether steam reforming catalyst of the present invention can be produced by a sol-gel method, for example, according to the following steps:

(1) A step of adding an acid, a Cu salt and at least one salt selected from the group consisting of Mn salts, Fe salts and Zn salts to an aluminum alkoxide to produce a sol.

(2) A step of drying the sol by evaporation to produce a gel and further calcinating the gel to obtain a solid.

(3) A step of reducing the solid.

In the first step, an acid, a Cu salt and at least one salt selected from the group consisting of Mn salts, Fe salts and Zn salts are added to an aluminum alkoxide to produce a sol. For example, it is preferable that an aluminum alkoxide is dispersed in an aqueous solution containing a salt of Mn and the like, then, an acid is added to this solution to control the pH to preferably 1 to 3, causing a hydrolysis reaction of an aluminum alkoxide to prepare a uniform sol. Furthermore, it may also be permissible that an acid is added to an aluminum alkoxide to control the pH to preferably 1 to 3, causing a hydrolysis reaction of an aluminum alkoxide to prepare a uniform sol, and an aqueous solution containing a salt of Mn and the like is added to the sol.

Not particularly restricted, this hydrolysis reaction is preferably conducted under the following conditions. That is, examples of a solvent include, but are not particularly limited to, water, alcohols (for example, ethylene glycol, ethanol, methanol, propanol, and butanol) and the like. For uniform dispersion or dissolution, the amount of a solvent is preferably 500 g to 2000 g per 100 g of an aluminum alkoxide. Particularly, for dissolving a metal salt to give affinity with an alkoxide, it is preferable to add ethylene glycol, butylenes glycol, ethanolamine, ethylene oxide or the like as a solvent in an amount of 10 g to 1000 g per 100 g of an aluminum alkoxide. For uniform mixing, the reaction temperature is preferably 10° C. to 90° C. For accelerating hydrolysis, it is preferable that the pH is controlled to 1 to 3 as described above. The concentration of a salt of Cu and the like will be described later.

Although the above-mentioned aluminum alkoxide (Al(OR)$_3$) is not particularly restricted, those in which OR is isopropoxide (—OCH(CH$_3$)$_2$), butoxide (—OC$_4$H$_9$) or ethoxide (—OC$_2$H$_5$) are preferable, and specifically preferable are aluminum isopropoxide (Al[OCH(CH$_3$)$_2$]$_3$), aluminum tri-n-butoxide (Al[CH$_3$(CH$_2$)$_2$CH$_2$O]$_3$), aluminum triethoxide (Al(C$_2$H$_5$O)$_3$) and the like. As described later, active alumina functions as a catalyst and simultaneously acts also as a carrier for Cu and the like, in the present invention. On the other hand, the present invention can also contain zeolite, silica alumina and the like as a carrier.

The acid for controlling pH and accelerating hydrolysis is not particularly restricted, and preferable are nitric acid and the like.

The above-mentioned Cu salt is not particularly restricted, and preferable are copper nitrate (Cu(NO$_3$)$_2$), copper acetate (Cu(CH$_3$COO)$_2$), copper acetylacetonate (Cu(CH$_3$COCHCOCH$_3$)$_2$) and the like. The above-mentioned Mn salt may be Mn of any oxidation number such as 2-valent, 4-valent, 6-valent or 7-valent and the like and is not particularly restricted, and preferable are manganese nitrate (Mn(NO$_3$)$_2$), manganese acetate (Mn(CH$_3$COO)$_2$), manganese acetylacetonate (Mn(CH$_3$COCHCOCH$_3$)$_3$) and the like. The above-mentioned Fe salt may be Fe of any oxidation number such as 2-valent or 3-valent and is not particularly restricted, and preferable are iron nitrate (Fe(NO$_3$)), iron acetate (Fe(CH$_3$COO)$_2$), iron acetylacetonate (Fe(CH$_3$COCHCOCH$_3$)$_3$) and the like. The above-mentioned Zn salt is not particularly restricted, and preferable are zinc nitrate (Zn(NO$_3$)$_2$), zinc acetate (Zn(CH$_3$COO)$_2$), zinc acetylacetonate (Zn(CH$_3$COCHCOCH$_3$)$_2$) and the like. The term sol is used almost synonymously with colloid solution, and means a condition of dispersing into liquid showing flowability and providing active Brownian motion of particles.

In the second step, the above-mentioned sol is dried by evaporation to produce a gel which is further calcinated to provide a solid. For example, it is preferable that the above-mentioned sol is dried by evaporation under reduced pressure utilizing an evaporator and the like to provide a gel which is further dried and calcinated. Specifically, it is preferable that the drying temperature is 70° C. to 200° C. and the calcination temperature is 400° C. to 550° C. to convert alumina into γ-alumina of high activity. For uniform calcination, it is preferable that an average particle size of 1000 μm or less is established after drying and before calcination. Gelling can be confirmed by, for example, solidification in an evaporator and, in some cases, pulverization.

As the third step, the above-mentioned solid is reduced. For example, it is preferable that the above-mentioned solid is reduced under a hydrogen atmosphere. Particularly, for reducing copper, it is preferable to conduct reduction under a hydrogen atmosphere of 0.1 atom to 1.0 atom, at 250° C. to 450° C. for 1 to 10 hours. By this treatment, Cu$^{2+}$ can be reduced to Cu$^0$ and Cu$^+$. Resulting nitric acid, isopropanol and the like are removed in a process of drying by evaporation and a process of calcination.

A catalyst prepared by a sol-gel method has low crystallinity, and the crystallite diameter can be decreased. A sol-gel method can make the degree of dispersion of a catalyst metal supported high, and the particle diameter of a metal small. Furthermore, since a catalyst metal is supported in a carrier in a condition as incorporated into the carrier, a catalyst can be obtained, which forms a network with a carrier, making sintering difficult, while, also making heat durability extremely excellent. There is also a feature that impurities, which can not be easily excluded by a co-precipitation method, can be easily purified by distillation or sublimation in a sol-gel method, furthermore, a catalyst uniform at a fine level can be obtained.

The steam reforming reaction of DME is represented by the following equation (1):

$$CH_3OCH_3 + 3H_2O \rightleftharpoons 2CO_2 + 6H_2 \quad (1)$$

However, in an actual reaction mechanism, reforming is conducted by a two-stage reaction as represented by the following equations (2) and (3):

$$CH_3OCH_3 + H_2O \rightleftharpoons 2CH_3OH \quad (2)$$

$$CH_3OH + H_2O \rightleftharpoons CO_2 + 3H_2 \quad (3)$$

As disclosed in the above-mentioned Japanese Patent Provisional Publication No. 2002-263504 by the present inventors, active alumina prepared by a sol-gel method is excellent for the reaction of the above-mentioned equation (2), and the reaction of the above-mentioned equation (3) is excellent when Cu is contained as a catalyst metal.

For enhancing a DME reforming ability, an enhanced effect is expected by increasing the supported amount of Cu capable of accelerating the reaction of the above-mentioned equation (3) as much as possible. However, a balance with active alumina capable of accelerating the reaction of the above-mentioned equation (2) is also important. Regarding its optimal composition, it has become apparent that an excellent reforming ability is obtained when Cu is supported in an amount of 25 to 35 wt % as taught in "The Chemical Society of Japan, 81$^{st}$ Spring Annual Meeting (2002)" by the present inventor. In this brief statement, Cu of 25 wt % indicates that the weight of Cu contained in a catalyst in terms of metal is 25% based on the total weight of a catalyst, provided it is hypothesized that a catalyst contains active alumina, Cu and at least one element selected from the group consisting of Mn, Fe and Zn, namely, that a nitric acid portion resulted from a salt, and the like are removed.

The present invention is characterized in that at least one element selected from Mn, Fe and Zn is contained, for further enhancing the ability of a catalyst composed mainly of Cu and active alumina, and in particular, for obtaining an excellent reforming ability even at lower temperatures of 200° C. to 275° C., at which activity is not obtained easily with conventional catalysts.

When the content of Cu is increased, the reforming ability increases due to an increase in the absolute amount of Cu, however, partially, it becomes a Cu surplus condition deteriorating Cu dispersion, resulting in that all the ability of Cu supported cannot be exhibited completely. However, by inclusion of at least one element selected from Mn, Fe and Zn, the dispersibility of Cu can be enhanced and Cu and Cu$^+$ believed to be catalytically active can be kept stable. By this, the effect of Cu supported can be extracted to the maximum, and a reforming catalyst excellent in low temperature activity can be obtained. Since a catalyst prepared by an impregnation method and the like supports most of a catalyst metal on its surface, a catalyst is immediately oxidized into CuO even if a reduction is conducted. In contrast, in the case of a catalyst prepared by a sol-gel method, a catalyst metal enters into a crystal, and is supported under high dispersion by Mn, Fe, Zn, therefore, the condition of Cu can be kept stable.

In this case, when the total content of Cu and at least one element selected from Mn, Fe and Zn is 25 wt % to 35 wt % (preferably, 30 wt %), more excellent activity can be obtained. When lower than 25 wt %, the reaction of the above-mentioned equation (3) does not progress efficiently, while when over 35 wt %, the amount of active alumina on the surface of a catalyst accelerating a hydrolysis reaction from DME into methanol decreases, consequently, the reaction of the above-mentioned equation (2) does not progress efficiently, and sufficient activity cannot be obtained, in some cases.

Furthermore, it is preferable that when Mn is contained, the Mn content is 0.1 wt % to 1.0 wt % (preferably 0.2 wt % to 0.8 wt %), when Fe is contained, the Fe content is 0.5 wt % to 2.0 wt % (preferably 0.7 wt % to 1.5 wt %), and when Zn is contained, the Zn content is 0.1 wt % to 7.0 wt % (preferably 0.2 wt % to 4.0 wt %), and in such a case the above-mentioned effect can be obtained more sufficiently. The reason for this is that when lower than each indicated concentration range, a sufficient effect resulted from the inclusion is not obtained in some cases. In contrast, when over the indicated concentration range, in some cases, an increase in bonds of Mn—Mn, Fe—Fe or Zn—Zn causes a decrease in specific surface area and the like, lowering in a reforming ability.

The catalyst of the present invention is characterized in that the pore diameter of the catalyst increases by inclusion of at least one element selected from Mn, Fe and Zn. Normally, a catalyst prepared by an impregnation method, co-precipitation method or the like shows a decrease in specific surface area when the pore diameter increases, while, the catalyst of the present invention does not show a decrease in specific surface area even when the pore diameter increases, and in contrast, shows an increase in specific surface area. Although the reason for this is not clearly known, it is hypothesized that by inclusion of Mn, Fe and/or Zn, a lattice defect, bond anomaly or the like are formed. When a specific surface area decreases, dispersion of a catalyst metal deteriorates and the number of catalyst active points decreases to cause lowering in the reforming ability, however, the catalyst of the present invention shows a further increase in the reforming ability by an increase in specific surface area.

In the catalyst of the present invention, it is preferable that the number of pores having pore diameters of 80 Å to 200 Å (preferably 100 Å to 150 Å) is largest by inclusion of Mn, Fe and/or Zn. Specifically, it is preferable that the ratio of the volume of pores having pore diameters of 80 Å to 200 Å is 35% or more (the ratio of pores having pore diameters of 100 Å to 150 Å is 20% or more) based on total pore volume. It is believed that in the case of pores of 80 Å to 200 Å, DME can easily enter into the pores, and the reaction of the above-mentioned equation (2) is most accelerated, resultantly, an excellent reforming ability is obtained even at lower temperatures of 200° C. to 275° C. In the case of pores of 200 Å or more, the sintering (aggregation) of a catalyst metal tends to occur, consequently, catalytic activity decreases in some cases. Pore distribution (pore volume per unit weight for pore diameter) can be measured by conducting de-gas treatment at 150° C. for 5 hours by Autosorb-1 manufactured by Quantachrome and then performing N$_2$ adsorption.

EXAMPLES

Examples of dimethyl ether steam reforming catalysts of the present invention and a method for producing the same will be shown below. Furthermore, comparative examples are used to show effectiveness of the catalytic function of a dimethyl ether steam reforming catalyst of the present invention.

Experiment Example 1

Preparation of Cu/Al$_2$O$_3$(Cu=0, 10, 20, 30, 40, 50 wt %), Content Published in the Chemical Society of Japan Into an eggplant-shaped flask containing 100 mL of hot water of 70° C. was charged aluminum isopropoxide (Al[OCH(CH$_3$)$_2$]$_3$, hereinafter, abbreviated as AIP) ground in a mortar in an amount of 12.652, 11.387, 10.122, 8.856, 7.591 or 6.326 g depending on the copper supporting amount, and the mixture was heated at 70° C. and stirred for 10 minutes to disperse AIP. Into this was added a copper nitrate aqueous solution (Cu content is 0 g, 0.300 g, 0.600 g, 0.900 g, 1.200 g, 1.500 g, depending on the Cu supporting amount), furthermore, 10 mL of ethylene glycol was added to this, and the mixture was stirred at 80° C. for 1 hour or more. Then, 10 mmol/L nitric acid was added in portions to accelerate hydrolysis, and the pH was controlled finally to 1 to 2, to obtain a clear sol. This liquid was stirred for 30 minutes or more remaining at 80° C., then, dried by evaporation by heating at 80° C. to 180° C. using an evaporator and an oil bath, obtaining a gelled solid and powder. This gel was dried at 180° C. for approximately 12 hours, ground in an agate mortar to 150 μm or less, further calcinated at 500° C. for 5 hours, then, reduced under a hydrogen atmosphere, to prepare catalysts each of 3.00 g having a Cu content in Cu/Al$_2$O$_3$ according to a sol-gel method of 0, 10, 20, 30, 40 or 50 wt %, respectively.

Example 1

Preparation of Cu—Mn(30 wt %)/Al$_2$O$_3$(Mn=0, 0.2, 0.5, 1.0, 1.5, 3.0 wt %)

Into an eggplant-shaped flask containing 100 mL of hot water of 70° C. was charged AIP ground in a mortar in an amount of 12.652, 11.387, 10.122, 8.856, 7.591 or 6.326 g depending on the metal supporting amount, and the mixture was heated at 70° C. and stirred for 10 minutes to disperse AIP. Into this was added a copper nitrate aqueous solution (Cu content is 0.9000 g, 0.8982 g, 0.8955 g, 0.8910 g, 0.8865 g, 0.8730 g, depending on the Cu supporting amount) and a manganese nitrate aqueous solution (Mn content is 0 g, 0.0018 g, 0.0045 g, 0.0090 g, 0.0135 g, 0.0270 g, depending on the Mn supporting amount), furthermore, 10 mL of ethylene glycol was added to this, and the mixture was stirred at 80° C. for 1 hour or more. Then, 10 mmol/L nitric acid was added in portions to accelerate hydrolysis, and pH was controlled finally to 1 to 2, to obtain a clear sol. This liquid was stirred for 30 minutes or more remaining at 80° C., then, dried by evaporation by heating at 80° C. to 180° C. using an evaporator and an oil bath, obtaining a gelled solid and powder. This gel was dried at 180° C. for approximately 12 hours, ground in an agate mortar to 150 μm or less, further calcinated at 500° C. for 5 hours, then, reduced under a hydrogen atmosphere, to prepare Cu—Mn/Al$_2$O$_3$ according to a sol-gel method, obtaining catalysts each of 3.00 g having a total concentration of Cu and Mn of 30 wt % and having a Mn concentration of 0, 0.2, 0.5, 1.0, 1.5 or 3.0 wt %, respectively.

Example 2

Preparation of Cu—Fe(30 wt %)/Al$_2$O$_3$(Fe=0, 0.5, 0.7, 1.0, 1.5, 3.0 wt %)

Into an eggplant-shaped flask containing 100 mL of hot water of 70° C. was charged AIP ground in a mortar in an amount of 12.652, 11.387, 10.122, 8.856, 7.591 or 6.326 g depending on the metal supporting amount, and the mixture was heated at 70° C. and stirred for 10 minutes to disperse AIP. Into this was added a copper nitrate aqueous solution (Cu content is 0.9000 g, 0.8955 g, 0.8937 g, 0.8910 g, 0.8865 g, 0.8730 g, depending on the Cu supporting amount) and an iron nitrate aqueous solution (Fe content is 0 g, 0.0045 g, 0.0063 g, 0.0090 g, 0.0135 g, 0.0270 g, depending on the Fe supporting amount), furthermore, 10 mL of ethylene glycol was added to this, and the mixture was stirred at 80° C. for 1 hour or more. Then, 10 mmol/L nitric acid was added in portions to accelerate hydrolysis, and the pH was controlled finally to 1 to 2, to obtain a clear sol. This liquid was stirred for 30 minutes or more remaining at 80° C., then, dried by evaporation by heating at 80° C. to 180° C. using an evaporator and an oil bath, obtaining a gelled solid and powder. This gel was dried at 180° C. for approximately 12 hours, ground in an agate mortar to 150 μm or less, further calcinated at 500° C. for 5 hours, then, reduced under a hydrogen atmosphere, to prepare Cu—Fe/Al$_2$O$_3$ according to a sol-gel method, obtaining catalysts each of 3.00 g having a total concentration of Cu and Fe of 30 wt % and having a Fe concentration of 0, 0.5, 0.7, 1.0, 1.5 or 3.0 wt %, respectively.

Example 3

Preparation of Cu—Zn(30 wt %)/Al$_2$O$_3$(Zn=0, 0.5, 1.0, 2.0, 3.0, 5.0, 9.0 wt %)

Into an eggplant-shaped flask containing 100 mL of hot water of 70° C. was charged AIP ground in a mortar in an amount of 12.652, 11.387, 10.122, 8.856, 7.591 or 6.326 g depending on the metal supporting amount, and the mixture was heated at 70° C. and stirred for 10 minutes to disperse AIP. Into this was added a copper nitrate aqueous solution (Cu content is 0.9000 g, 0.8955 g, 0.8910 g, 0.8820 g, 0.8730 g, 0.8550 g, 0.8190 g depending on the Cu supporting amount) and a zinc nitrate aqueous solution (Zn content is 0 g, 0.0045 g, 0.0090 g, 0.0180 g, 0.0270 g, 0.0450 g, 0.0810 g depending on the Zn supporting amount), furthermore, 10 mL of ethylene glycol was added to this, and the mixture was stirred at 80° C. for 1 hour or more. Then, 10 mmol/L nitric acid was added in portions to accelerate hydrolysis, and the pH was controlled finally to 1 to 2, to obtain a clear sol. This liquid was stirred for 30 minutes or more remaining at 80° C., then, dried by evaporation by heating at 80° C. to 180° C. using an evaporator and an oil bath, obtaining a gelled solid and powder. This gel was dried at 180° C. for approximately 12 hours, ground in an agate mortar to 150 μm or less, further calcinated at 500° C. for 5 hours, then, reduced under a hydrogen atmosphere, to prepare Cu—Zn/Al$_2$O$_3$ according to a sol-gel method, obtaining catalysts each of 3.00 g having a total concentration of Cu and Zn of 30 wt % and having a Zn concentration of 0, 0.5, 1.0, 2.0, 3.0, 5.0 or 9.0 wt %, respectively.

DME Steam Reforming Reaction Experiment Method

The catalysts each of 0.1 g prepared in Experiment Example 1 and Examples 1 to 3 were placed in a reaction tube of a normal pressure flow-through type reactor, and vaporized DME and water (DME–water=2–6 mmol $g_{-cat}^{-1}$ $h^{-1}$, respectively) were introduced by an argon gas into the reaction tube to contact with the catalyst, and a gas produced after passing through the catalyst was analyzed by gas chromatography; thus, the rate of hydrogen production (mmol $g_{-cat}^{-1} h^{-1}$) by steam-reforming of DME was measured. In this operation, the reaction tube containing the catalyst was heated by an electric furnace to control the reaction temperature to 250° C.

FIG. 1 shows the hydrogen production rate for the Cu content of the catalyst prepared in Experiment Example 1 (this is content published in The Chemical Society of Japan, 81st Spring Annual Meeting (2002)). By this, it is known that when Cu is contained in an amount of 25 wt % to 35 wt % (preferably 30 wt %), the hydrogen production rate is fast and reforming ability is excellent.

Figure 2:
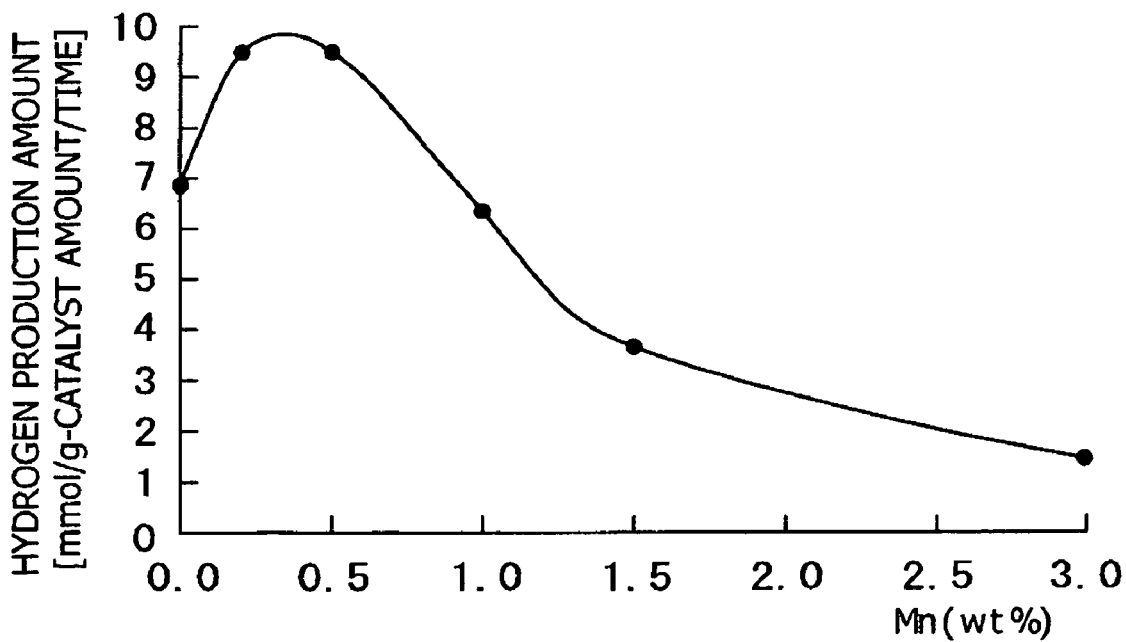
FIG. 2 is a graph showing the rate of hydrogen production for the Mn content of a Cu—Mn(30 wt %)/$Al_2O_3$ catalyst prepared by a sol-gel method, in a steam reforming reaction (250° C.) of DME.

FIG. 2 shows the hydrogen production rate for the Mn content of the Cu—Mn(30 wt %)/$Al_2O_3$ catalyst prepared in Example 1. By this, it is known that when Mn is contained in an amount of 0.1 wt % to 1.0 wt % (preferably 0.2 wt % to 0.8 wt %), the hydrogen production rate is fast and reforming ability is excellent even at a low temperature such as 250° C. at which a reforming reaction does not occur easily with a normal catalyst.

Figure 3:
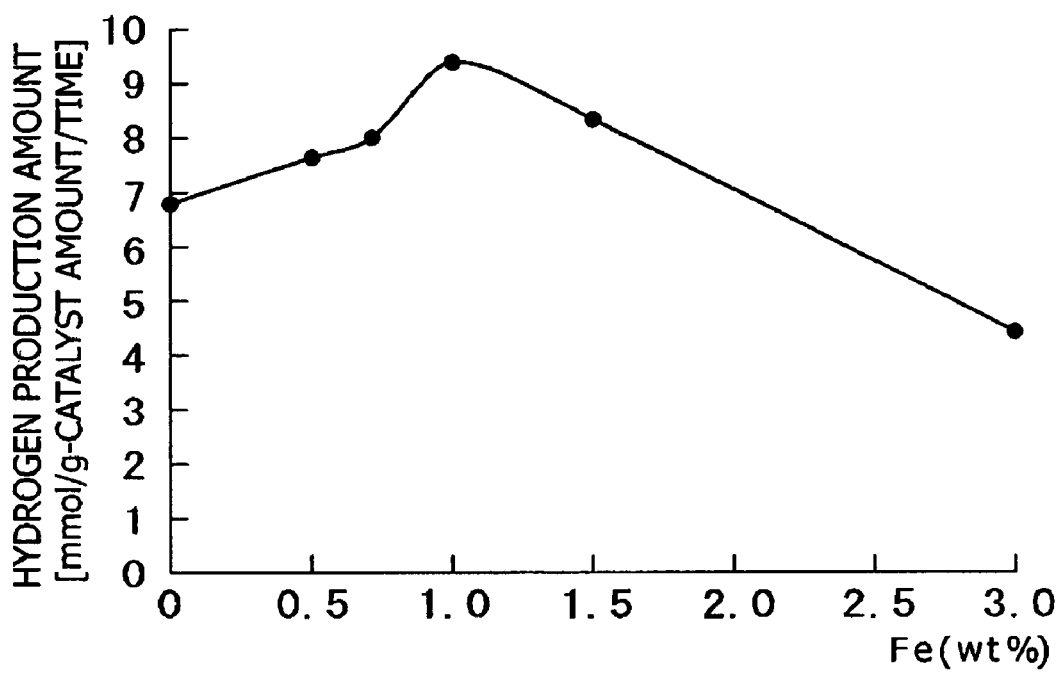
FIG. 3 is a graph showing the rate of hydrogen production for the Fe content of a Cu—Fe(30 wt %)/$Al_2O_3$ catalyst prepared by a sol-gel method, in a steam reforming reaction (250° C.) of DME.

FIG. 3 shows the hydrogen production rate for the Fe content of the Cu—Fe(30 wt %)/$Al_2O_3$ catalyst prepared in Example 2. By this, it is known that when Fe is contained in an amount of 0.5 wt % to 2.0 wt % (preferably 0.7 wt % to 1.5 wt %), the hydrogen production rate is fast and reforming ability is excellent.

Figure 4:
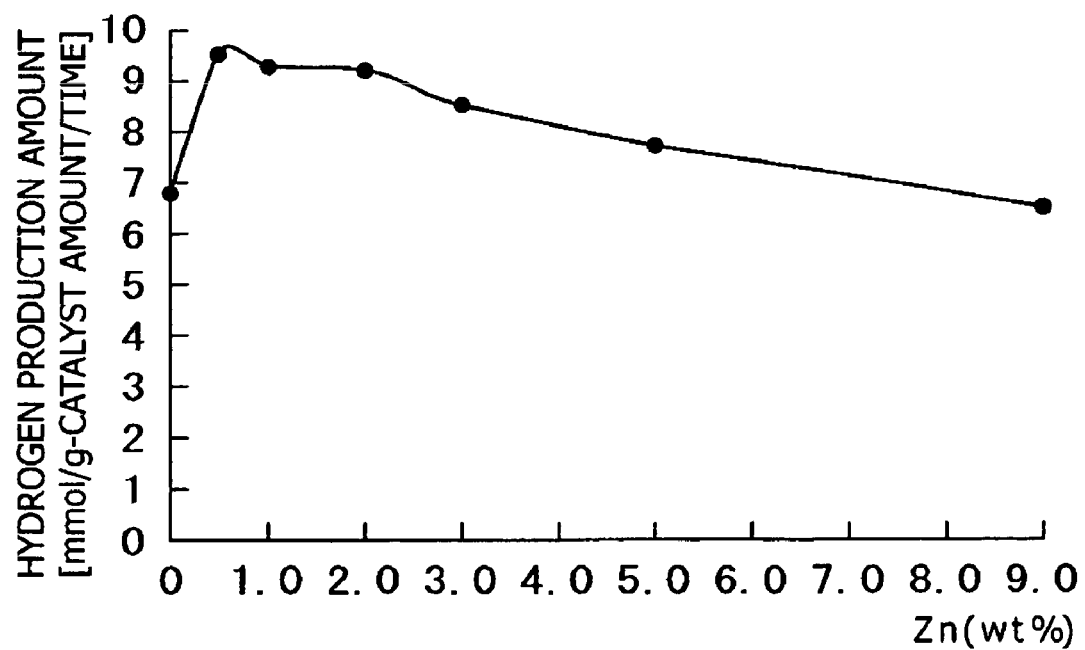
FIG. 4 is a graph showing the rate of hydrogen production for the Zn content of a Cu—Zn(30 wt %)/$Al_2O_3$ catalyst prepared by a sol-gel method, in a steam reforming reaction (250° C.) of DME.

FIG. 4 shows the hydrogen production rate for the Zn content of the Cu—Zn(30 wt %)/$Al_2O_3$ catalyst prepared in Example 3. By this, it is known that when Zn is contained in an amount of 0.1 wt % to 7.0 wt % (preferably 0.2 wt % to 4.0 wt %), the hydrogen production rate is fast and reforming ability is excellent.

Comparative Example 1

Cu—Zn/$Al_2O_3$ by Impregnation Method 10 g of commercially available γ-$Al_2O_3$ (BK-103, manufactured by Sumitomo Chemical Industry Co., Ltd.) was impregnated in a copper nitrate aqueous solution containing 5.0 g of copper and a zinc nitrate aqueous solution containing 5.0 g of zinc while stirring for 12 hours or more, and after drying, calcinated at 500° C. for 5 hours, then, reduced under a hydrogen atmosphere, to prepare 20 g of Cu—Zn (25-25 wt %)/$Al_2O_3$ according to an impregnation method. In this operation, preparation was conducted so that the total amount of Cu and Zn was 50 wt % and Cu/Zn=25/25. This is a catalyst generally judged to be advantageous for methanol synthesis and methanol steam reforming reaction.

X-ray Diffraction Measurement

Figure 5:
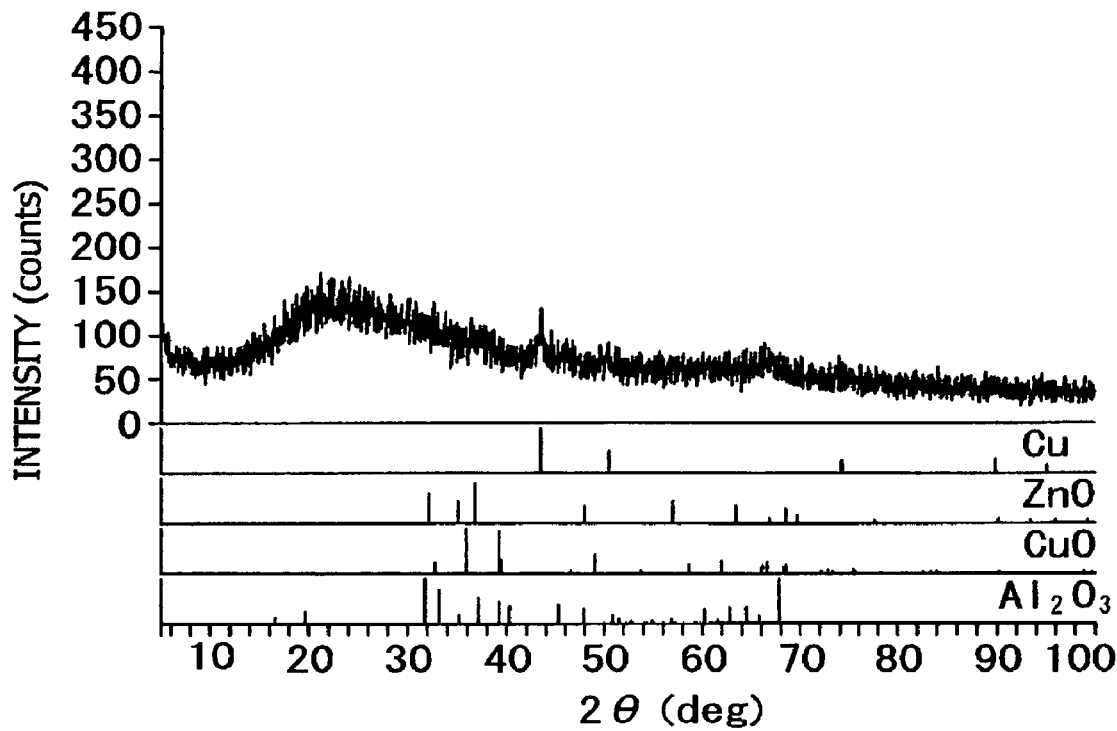
FIG. 5 is a graph showing the X-ray diffraction measurement result of a Cu—Zn(27-3 wt %)/$Al_2O_3$ catalyst prepared by a sol-gel method.
Figure 6:
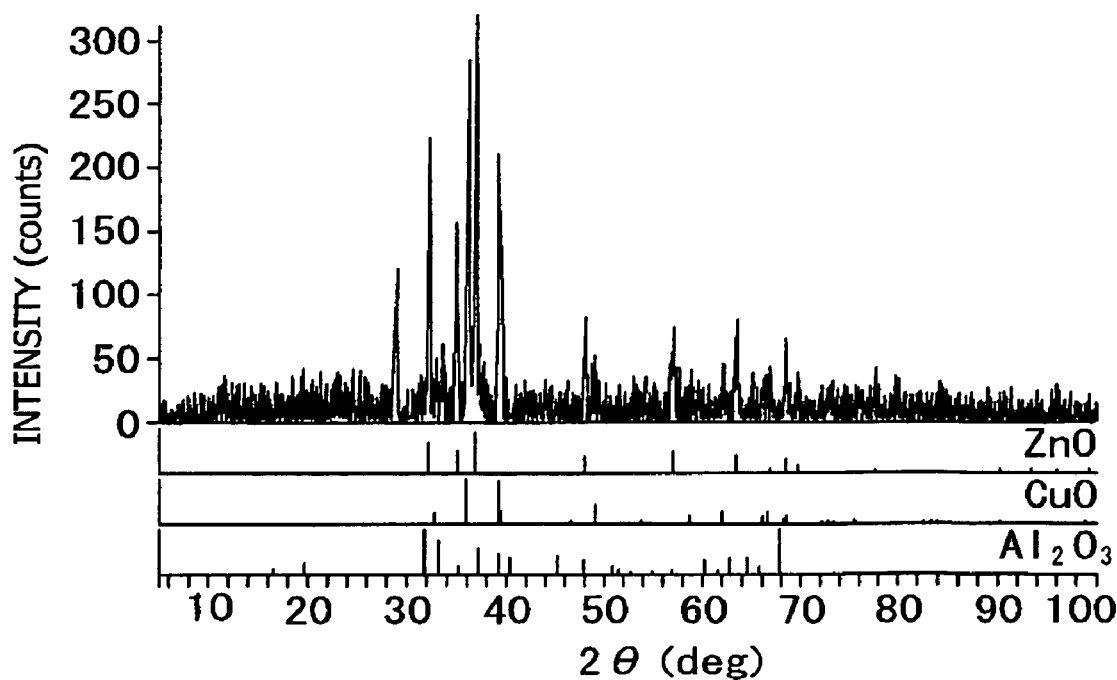
FIG. 6 is a graph showing the X-ray diffraction measurement result of a Cu—Zn(25-25 wt %)/Al$_2$O$_3$ catalyst prepared by an impregnation method.

X-ray diffraction measurement was conducted for the Cu—Zn(27-3 wt %)/$Al_2O_3$ catalyst prepared by a sol-gel method in Example 3 and the Cu—Zn(25-25 wt %)/$Al_2O_3$ catalyst prepared by an impregnation method in Comparative Example 1. FIG. 5 shows the results of Cu—Zn(27-3 wt %)/$Al_2O_3$ (sol-gel) and FIG. 6 shows the results of Cu—Zn (25-25 wt %)/$Al_2O_3$ (impregnation). The catalyst prepared by a sol-gel method shows completely broader X-ray strength, teaching lower crystallinity, as compared with the catalyst prepared by an impregnation method. The reason for this is believed to be that the diameter of crystallite is smaller. By this, the catalyst prepared by a sol-gel method has an advantage in that a more uniform catalyst at a fine level can be obtained as compared with the catalyst prepared by an impregnation method. A CuO peak is observed in FIG. 6 (impregnation method), while only a Cu peak is observed in FIG. 5 (sol-gel method). The reason for this is that in the case of the catalyst prepared by an impregnation method or the like, most of the catalyst metal is supported on the surface, consequently, the catalyst metal is immediately oxidized into CuO even if a reduction is conducted, while in the case of the catalyst prepared by a sol-gel method, the catalyst metal enters into a crystal and is supported under high dispersion by Mn, Fe, Zn, therefore, the condition of Cu can be kept stable.

CO Gas Adsorption Measurement

Figure 7:
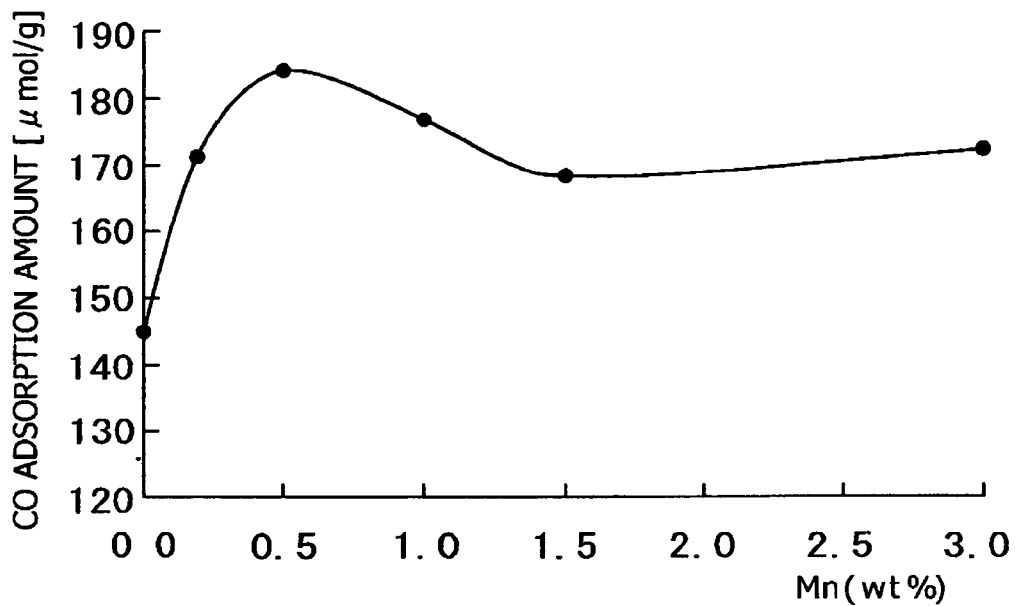
FIG. 7 is a graph showing the CO gas adsorption measurement result for the Mn content of a Cu—Mn(30 wt %)/Al$_2$O$_3$ catalyst prepared by a sol-gel method.

The adsorption amount of a CO gas was measured at 0° C. using each 0.1 g of the Cu—Mn(30 wt %)/$Al_2O_3$ catalysts (6 kinds, depending on the Mn content) prepared in Example 1. The apparatus used in this experiment is connected also to a close circulation type apparatus made of Pyrex, therefore, the CO adsorption amount and the like under a reduced condition can be measured without exposing the catalyst in air before the reaction. A known amount of CO gas was introduced into a catalyst layer cooled to 0° C., and based on its pressure variation, the CO adsorption amount onto the catalyst was calculated. This operation was repeated several times at 100 mmHg to 250 mmHg, and the total amount was used as the CO adsorption amount onto this catalyst. In the case of this catalyst, it is believed that Cu and Mn in a metal condition adsorb CO, and Mn is in an oxidized condition (since Cu contributes to catalyst activity, Mn may be in the form of an oxidized condition), CO is adsorbed to Cu. As a result, the amount of active points working for DME steam reforming can be used as the CO adsorption amount. FIG. 7 shows the results of the CO adsorption amount for the Mn content. As is known from this result, when Mn is contained, the CO adsorption amount increases and the amount of active points working for DME steam reforming increases, as compared with the case containing no Mn. This shows that by inclusion of Mn, the dispersion of Cu is increased and Cu is kept stable.

Measurement of Pore Distribution, Specific Surface Area

Figure 8:
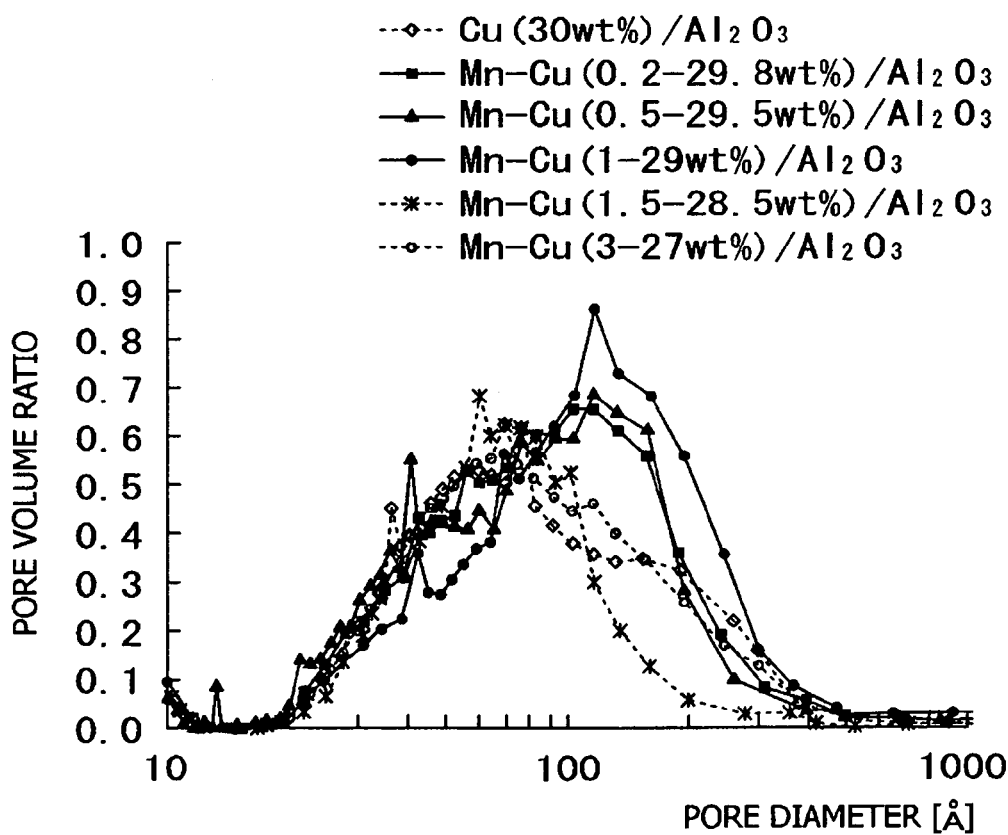
FIG. 8 is a graph showing the pore distribution result for the Mn content of a Cu—Mn(30 wt %)/Al$_2$O$_3$ catalyst prepared by a sol-gel method.
Figure 9:
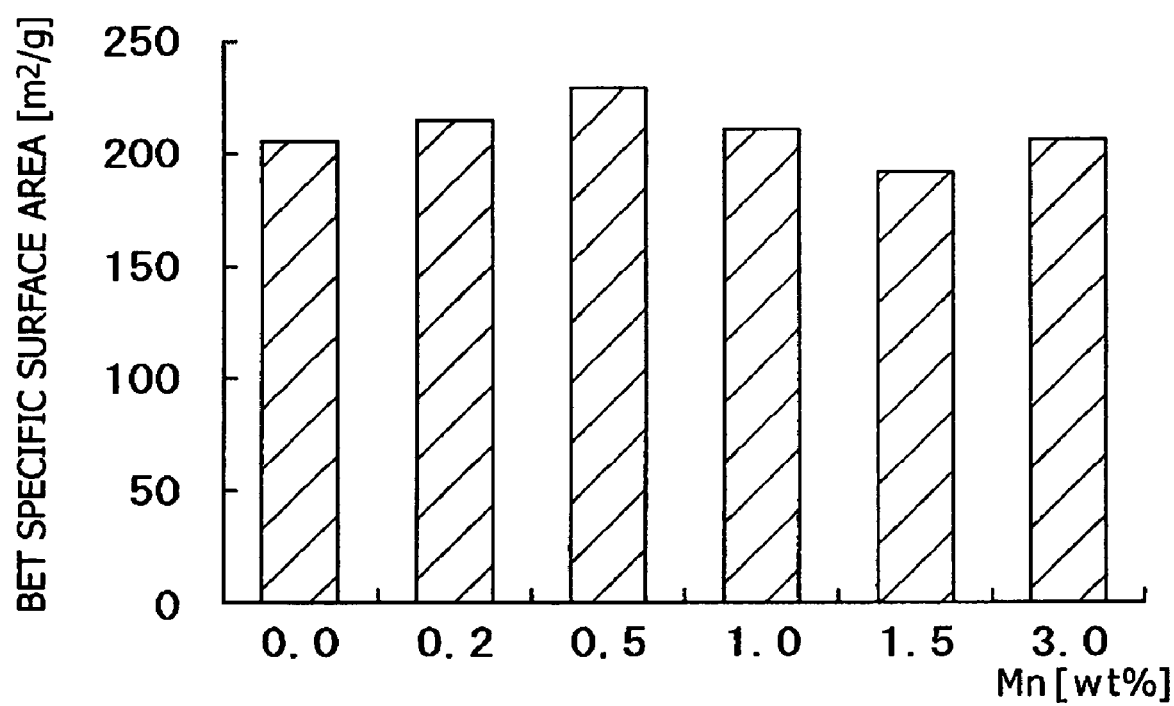
FIG. 9 is a graph showing the specific surface area result for the Mn content of a Cu—Mn(30 wt %)/Al$_2$O$_3$ catalyst prepared by a sol-gel method.

Pore distribution (pore volume per unit weight for pore diameter) and specific surface area (surface area per unit weight) were measured by Autosorb-1 manufactured by Quantachrome using each 0.2 g of the Cu—Mn(30 wt %)/$Al_2O_3$ catalysts (6 kinds, depending on the Mn content) prepared in Example 1. This apparatus conducts measurement by effecting de-gassing treatment at 150° C. for 5 hours, then, performing adsorption of $N_2$. The results of pore distribution are shown in FIG. 8, and the results of specific surface area are shown in FIG. 9. As is known from the results in FIG. 8, when Mn is not contained (Cu(30 wt %)/$Al_2O_3$), the amount of pores present having pore diameters of 50 to 80 Å is largest, while when Mn is contained in an amount of 0.2, 0.5 or 1.0 wt % (Cu—Mn (29.8-0.2 wt %)/$Al_2O_3$, Cu—Mn(29.5-0.5 wt %)/$Al_2O_3$), Cu—Mn(29-1 wt %)/$Al_2O_3$), the amount of pores having pore diameters of 100 Å to 150 Å is largest.

The reason for this is believed to be that by inclusion of Mn, the pore diameters shift to the larger side. In pores of 100 Å to 150 Å, DME easily enters pores to promote the reaction of the above-mentioned equation (2) most efficiently, consequently, a catalyst excellent in low temperature activity is obtained. From the results of FIG. 9, when Mn is contained in an amount of 0.2, 0.5 or 1.0 wt %, the specific surface area increases as compared to the case containing no Mn. In catalysts prepared by a general impregnation method and the like, the specific surface area decreases when the pore diameter increases, while in the catalysts prepared by a sol-gel method according to the present invention, the pore diameter increased and also the specific surface area increased. The reason for this is hypothesized that in the case of catalysts obtained by an impregnation method and the like, the specific surface area decreases and simultaneously the pore diameter increases normally because of sintering (aggregation) and the like, while in the case of the catalysts according to the present invention, Mn contained caused a bond anomaly on bonding of Cu, Al, O and a lattice defect. By this, the catalyst of the present invention is excellent in reforming ability and further excellent also in heat durability.

In the specification and example, there have been disclosed typical preferred embodiments of the invention and, although specific terms are employed, they are used in a generic and descriptive sense only and not for purposes of limitation of the scope of the invention set forth in the following claims.

The invention claimed is:

1. A dimethyl ether steam reforming catalyst capable of steam-reforming dimethyl ether to obtain hydrogen, comprising active alumina, Cu, and at least one element selected from the group consisting of Mn and Fe, wherein the catalyst is prepared by a sol-gel method and the catalyst has a porous structure, and wherein an amount of pores having pore diameters of 80 Å to 200 Å occupy a largest volume in said porous structure and the volume of pores having pore diameters of 80 Å to 200 Å is 35 percent or more based on total pore volume.

2. The dimethyl ether steam reforming catalyst according to claim 1, wherein the total content of said Cu and said at least one element is 25 wt % to 35 wt %.

3. A dimethyl ether steam reforming catalyst capable of steam-reforming dimethyl ether to obtain hydrogen, comprising active alumina, Cu, and at least one element selected from the group consisting of Mn, Fe and Zn, wherein the catalyst is prepared by a sol-gel method and the catalyst has a porous structure, and wherein an amount of pores having pore diameters of 80 Å to 200 Å occupy a largest volume in said porous structure and the volume of pores having pore diameters of 80 Å to 200 Å is 35 percent or more based on total pore volume.

4. The dimethyl ether steam reforming catalyst according to claim 1 or 3, wherein said at least one element contains 0.1 wt % to 1.0 wt % of Mn.

5. The dimethyl ether steam reforming catalyst according to claim 1 or 3, wherein said at least one element contains 0.5 wt % to 2.0 wt % of Fe.

6. The dimethyl ether steam reforming catalyst according to claim 3, wherein said at least one element contains 0.1 wt % to 7.0 wt % of Zn.

7. A method of producing the dimethyl ether steam reforming catalyst according to claim 1 or 3 comprising the steps of:

adding an acid, a Cu salt and at least one salt selected from the group consisting of Mn salts, Fe salts and Zn salts to an aluminum alkoxide to produce a sol;

drying the resulting sol by evaporation to produce a gel;

calcinating the resulting gel to obtain a solid; and reducing the resulting solid.

* * * * *

UNITED STATES PATENT AND TRADEMARK OFFICE
CERTIFICATE OF CORRECTION

PATENT NO. : 7,241,718 B2
APPLICATION NO. : 10/730638
DATED : July 10, 2007
INVENTOR(S) : Takeishi et al.

It is certified that error appears in the above-identified patent and that said Letters Patent is hereby corrected as shown below:

On Title Page:

Item (73): Please correct to read as:
-- President of Shizuoka University and Suzuki Motor Corporation, Shizuoka-Ken (JP)--.

Signed and Sealed this

Twenty-third Day of October, 2007

JON W. DUDAS
*Director of the United States Patent and Trademark Office*